(No Model.)

J. B. McCUTCHEON.
BAND CUTTER AND FEEDER.

No. 424,334. Patented Mar. 25, 1890.

WITNESSES
T. W. Fowler
W. H. Patterson

INVENTOR
John B. McCutcheon,
by A. H. Evans & Co.
Attorneys.

UNITED STATES PATENT OFFICE.

JOHN B. McCUTCHEON, OF BATTLE CREEK, MICHIGAN.

BAND-CUTTER AND FEEDER.

SPECIFICATION forming part of Letters Patent No. 424,334, dated March 25, 1890.

Application filed December 2, 1889. Serial No. 332,321. (No model.)

*To all whom it may concern:*

Be it known that I, JOHN B. MCCUTCHEON, a citizen of the United States, residing at Battle Creek, in the county of Calhoun and State of Michigan, have invented certain new and useful Improvements in Band-Cutters and Feeders, of which the following is a full and clear description, reference being had to the accompanying drawings, forming part of this specification, in which—

Figure 1:
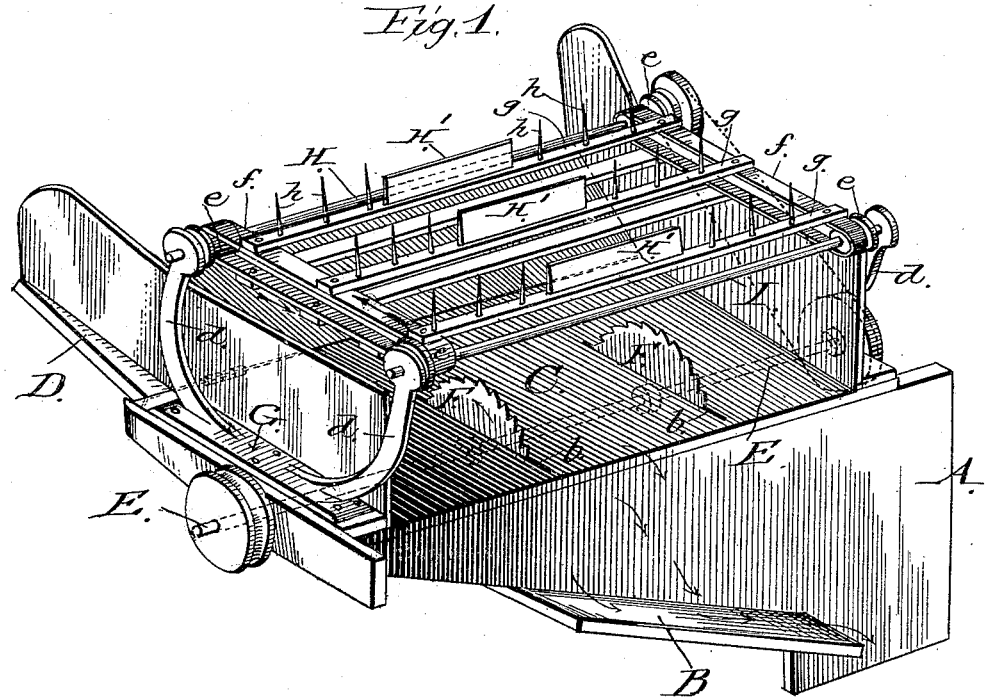
Figure 2:
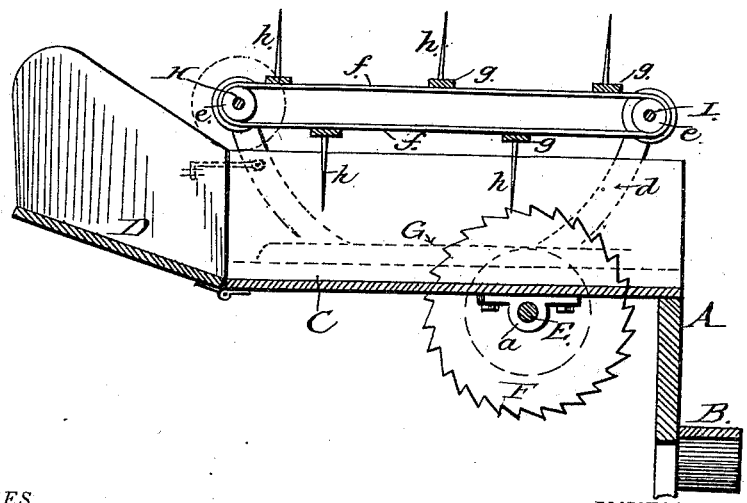

Figure 1 represents a perspective view of a band-cutter and feeder embodying my invention. Fig. 2 is a sectional view of same.

My invention relates to certain improvements in band-cutters and feeders for thrashing-machines; and it consists in the constructions and combinations of devices which I shall hereinafter fully describe and claim.

To enable others skilled in the art to make and use my invention, I will now describe its construction and indicate the manner in which the same is carried out.

In the drawings, A represents any suitable frame, which may form a portion of the frame of the thrashing-machine, having at its front end a feed-board B, which delivers the straw and heads to the cylinder of the thrashing-machine in any well-known manner.

The frame A has a table C, to which a drop-leaf or movable section D is hinged or pivoted, and beneath this table, in journals $a$ on the bottom thereof, is mounted a transverse shaft E, which carries a plural number of circular saws F, (here shown as two in number,) which project through slots $b$ in the table for a purpose to be hereinafter explained. On one end of the shaft E is secured a pulley, to which motion is applied in any well-known manner to rotate the shaft and its saws at a high rate of speed.

Brackets G, secured to the side portions of the frame A, have upwardly-extending arms $d$, formed with journal-bearings for the shafts H and I of the feeder and band-cutter, the said shafts carrying pulleys $c$, around which pass endless belts $f$, connected together by transverse slats $g$, provided with teeth or pins $h$ for engaging and feeding the bound bundles of straw forward. In addition to the teeth or pins the slats $g$ carry the knives or cutters H', which are longitudinally disposed on said slats and adapted to cut the cords or bands with which the bundles are bound, whereby the loose straw is fed directly to the saws or cutters and by them cut into three or more pieces before it reaches the thrashing-cylinder, thereby separating the straw to insure a faster feed to the cylinder and obviating the tendency of the long straw to wind around and become tangled with the cylinder.

Having thus described my invention, what I claim as new, and desire to secure by Letters Patent, is—

1. The combination, with a main frame, of an approximately horizontally traveling carrier having means for feeding the sheaves forward, cutters mounted on the carrier for severing the binding-cords, saws operating through the floor of the frame for cutting the straw into short lengths, and means for operating the carrier and saws, substantially as described.

2. The combination, with a frame or support, of the shafts H and I and means for communicating motion thereto, the belts $f$, the transverse slats secured to the belts, having pins or teeth, and the cutters or knives on the slats for severing the cords with which the sheaves are bound, substantially as described.

3. The combination of the table with its hinged leaf or section, the shafts H and I, having pulleys, and the supports for the shafts, the belts adapted to pass around said pulleys and provided with teeth or pins and knives or cutters, a transverse shaft beneath the table, saws on said shaft, projecting through slots in the table and adapted to cut the straw into lengths, and means for rotating the shaft, substantially as described.

JOHN B. McCUTCHEON.

Witnesses:
FRED M. WADLEIGH,
ABRAHAM LAGARSEE.